United States Patent
Syrjärinne et al.

(10) Patent No.: US 8,564,479 B2
(45) Date of Patent: Oct. 22, 2013

(54) GNSS SATELLITE FREQUENCY IS IN GNSS ASSISTANCE DATA STANDARDS

(75) Inventors: Jari Syrjärinne, Tampere (FI); Ismo Halivaara, Tampere (FI); Lauri Wirola, Tampere (FI)

(73) Assignee: Nokia Corporation, Espoo (FI)

( * ) Notice: Subject to any disclaimer, the term of this patent is extended or adjusted under 35 U.S.C. 154(b) by 262 days.

(21) Appl. No.: 13/001,515

(22) PCT Filed: Jun. 22, 2009

(86) PCT No.: PCT/FI2009/050550
§ 371 (c)(1),
(2), (4) Date: Dec. 27, 2010

(87) PCT Pub. No.: WO2009/156582
PCT Pub. Date: Dec. 30, 2009

(65) Prior Publication Data
US 2011/0109505 A1 May 12, 2011

Related U.S. Application Data

(60) Provisional application No. 61/076,545, filed on Jun. 27, 2008.

(51) Int. Cl.
*G01S 19/05* (2010.01)
(52) U.S. Cl.
USPC .................................................. 342/357.42
(58) Field of Classification Search
USPC ............ 342/357.42, 357.43, 357.64, 357.67; 701/408, 468
See application file for complete search history.

(56) References Cited

U.S. PATENT DOCUMENTS

2002/0005801 A1   1/2002   Lyusin
2007/0275658 A1   11/2007  Gaal et al.

FOREIGN PATENT DOCUMENTS

WO   2007099196 A1   9/2007
WO   2008035143 A1   3/2008

OTHER PUBLICATIONS

International Search Report PCT/FI2009/050550, Oct. 14, 2009, 3 pages.
"*Assisted Global Navigation Satellite Systems (A-GNSS);*" 3GPP TS 34.172, V1.0.0; dated Nov. 2010; retrieved on Apr. 2, 2013 from <http://www.3gpp.org/ftp/Specs/html-info/34172.htm>.

(Continued)

*Primary Examiner* — Dao Phan
(74) *Attorney, Agent, or Firm* — Alston & Bird LLP

(57) ABSTRACT

Systems and methods are provided to allow for the use of existing satellite identification parameters generically, so as to allow for Global Navigation Satellite System (GLONASS) identification. In addition, an optional or conditional parameter is linked to the satellite identification parameter for a frequency identification, where frequency identification is indicative of a Frequency Division Multiple Access (FDMA) frequency value. Such a frequency identification parameter is optional as it is needed only for current GLONASS and/or near-future GLONASS (e.g., GLONASS-M) satellites. Hence, utilization of the frequency identification parameter maybe unnecessary and therefore, not included/not linked when considering next generation GLONASS satellites, e.g., GLONASS-K satellites. Additionally, signals supported by particular global positioning system (GPS) satellites can be indicated with the use of generic satellite identification.

17 Claims, 4 Drawing Sheets

(56) References Cited

OTHER PUBLICATIONS

"*Assisted GPS, Standards*;" Wikipedia; retrieved on Apr. 2, 2013 from <http://en.wikipedia.org/wiki/Assisted_GPS#Standards>.
National Maritime Electronics Association (NMEA) 0183version 3.01; dated Jan. 1, 2002.
Radio Technical Commission for Maritime Services (RTCM) specification v3.0; dated Feb. 10, 2004; retrieved: RTCM Standard 10403.1; dated Oct. 27, 2006.
Substantive Examination Report Stage 1 for Indonesian Application No. W00 2010 04534; dated Mar. 1, 2013.
PCT Search Report and Written Opinion for PCT/FI2009/050550, Oct. 14, 2009.

GNSS SATELLITE FREQUENCY IS IN GNSS ASSISTANCE DATA STANDARDS

RELATED APPLICATION

This application was originally filed as PCT Application No. PCT/FI2009/050550 filed Jun. 22, 2009, which claims priority benefit from U.S. Provisional Application No. 61/076,545, filed Jun. 27, 2008.

FIELD OF THE INVENTION

The present invention relates generally to Global Navigation Satellite System (GNSS) location-based services. More particularly, the present invention relates to providing satellite and frequency identification for GNSS satellites in the Assisted GNSS (A-GNSS) specifications by adding frequency band-related information to assistance data information elements.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Location services based on the location of mobile devices are becoming increasingly widespread. Assistance data for assisted navigation systems, such as GNSS, have been specified and standardized for cellular systems, e.g., global positioning systems (GPS), European Galileo, and Russian Global Navigation Satellite System (GLONASS). An exemplary GNSS can comprise a network of satellites that broadcasts navigation signals including time and distance data. GNSS receivers pick up these broadcasted navigation signals and calculate a precise global location based thereon. Other examples of GNSS include, but are not limited to, satellite-based augmentation systems (SBAS), local area augmentation systems (LAAS), quasi-zenith satellite systems (QZSS), and hybrid receivers.

The delivery of such assistance data can be built on top of cellular system-specific control plane protocols including, e.g., the radio research location services protocol (RRLP) for GSM networks, the radio resource control (RRC) layer of layer 3 in wideband code division multiple access (WCDMA) networks, and IS-801 for Code Division Multiple Access (CDMA) networks. It should be noted that assistance data as described herein, can refer to GNSS assistance containing, but not limited to, navigation models, time assistance, reference location, atmosphere models, differential corrections, sensor assistance and acquisition assistance. The assistance data can also include e.g. position information, high-accuracy position, information, multi-frequency multi-GNSS measurement data, computationally-generated measurements, sensor measurements, route information and waypoint information.

Common features exist in a majority, if not all of the protocols including, but not limited to those described above for delivering assistance data. However, when differences arise, a terminal's software must either have an adaptation layer for the relevant protocols or is limited to supporting only some, but not all of the protocols. Additionally, whenever a new cellular system (e.g., networks using worldwide interoperability for microwave access (WiMAX) technology or a standard such as the long term evolution (LTE) standard, a successor to GSM), is brought into use, a terminal must adapt to the specifics of that system/network as well.

In response to the above, the Open Mobile Alliance (OMA) has defined a user plane protocol referred to as secure user plane location (SUPL) 1.0. SUPL employs user plane data bearers for transferring location assistance information such as GPS assistance data, as described above, for carrying positioning technology-related protocols between terminal, e.g., a mobile communication device and its operating network. SUPL is intended to be an alternative and, at the same time, a complement to the existing standards based on signaling in the mobile network control plane. SUPL assumes that a mobile or other network can establish a data bearer connection between a terminal and some type of location server. The use of a user plane protocol is especially appealing in the case of Internet Protocol (IP) networks where the data bearer is by nature, available.

In 2008, both the $3^{rd}$ Generation Partnership Project (3GPP) and the Open Mobile Alliance (OMA) standardization bodies have accelerated efforts to standardize GNSS assistance for various satellite systems that are as of yet, unsupported in the respective standards specifications. Current support in the standards has been implemented for GPS and Galileo only thus far. In a next phase, support is to be extended to modernized GPS, GLONASS, QZSS, and a number of SBASs. Each of the aforementioned systems has certain characteristics and/or features unique to those systems which need special attention with regard to integrating such features to assistance specifications.

The current GLONASS system (e.g., GLONASS and GLONASS-M satellites) uses a Frequency Division Multiple Access (FDMA) scheme to separate satellite transmissions from each other. Due to the use of FDMA, none of the visible satellites transmit on exactly the same frequency band, where each satellite is transmitting on its own nominal frequency. However, the same nominal transmission frequency can be allocated to another satellite, although when doing so, the satellites should be located at opposite sides of an orbit so as not to interference with any other satellites on the same frequency. The GLONASS transmission frequencies and used frequency bands are described in the GLONASS Interface Control Document (ICD), while currently employed satellite-frequency allocation is described at, e.g., http://www.glonass-ianc.rsa.ru. Furthermore, it should be noted that GLONASS satellites that are launched after 2005 will employ the following frequency channels: $k=(-7 \ldots +6)$ from the range −7 through 13 (i.e., 21 values).

It is envisioned that the next generation of GLONASS system will utilize a CDMA scheme similar to that utilized by GPS to separate the satellites. Thus, in a next generation GLONASS system, each satellite will transmit on exactly the same nominal frequency, but use a different spreading code (pseudorandom code). The next generation GLONASS satellites are referred to as GLONASS-K satellites.

Additionally, GLONASS satellites are located on three orbits referred to as I, II and III. Each of these three orbits can nominally populate at most, 8 satellites, giving a maximum nominal constellation of 3×8, i.e., 24 satellites. In the future, the GLONASS-K constellation may be modified to support a greater number of satellites, e.g., up to 30 satellites.

The GPS constellation as well is undergoing modernization, where new frequencies and signals are being allocated for open service and military use. Additionally, new data content is being added to conventional navigation data improve performance and provide new services. These upcoming changes are documented and publicly available in form of ICDs.

However, GPS is an existing system and its services are already in wide use thereby preventing an "overnight" process of modernization. For example, one challenge for the US Department of Defense (DoD) in terms of GPS modernization is the deployment of new satellites with the new signals and services that are to gradually replace the existing generation of satellites. The size of the GPS constellation cannot exceed 32 satellites, and with 31 satellites currently in the constellation, coupled with a rather long lifetime for the satellites, replacing the entire GPS constellation with next generation satellites can take as long as 10-15 years. Moreover, GPS modernization does not merely include the introduction of one totally new generation of satellites, but rather also includes considering a number of parallel generations of satellites listed in Table 1. As can be seen, the supported open service signals (and frequencies) differ greatly from generation to generation.

TABLE 1

GPS Satellite Generations

| Generation | Open Service Signals | Status |
| --- | --- | --- |
| GPS IIR | Link 1 Coarse Acquisition signals (L1CA) | Deployed |
| GPS IIR-M | L1CA and Link 2 Civil/open service signals (L2C) | 3 launched + 5 to come |
| GPS IIF | L1CA, L2C and Link 5 open service signals (L5) | First launch expected in 2009 |
| GPS III | L1CA, L2C, L5 and Link 1 Civil (modernized L1 open service) signals (L1C) | Under planning |

Because of the FDMA scheme, there is no need to allocate different spreading codes to the satellites. However, all GLONASS satellites utilize the same pseudorandom code for signal modulation. Contrary to GPS, where each satellite has its own pseudorandom code identified by a pseudorandom code number (PRN), GLONASS signals do not possess an unambiguous physical signature to identify the satellites. Additionally and as indicated above, transmission frequency in GLONASS can be shared among more than one satellite. This lack of unambiguous identity can be problematic from an Assistance Data Service perspective because unambiguously linking certain pieces of assistance data to specific satellites when PRN or Frequency Index cannot be utilized may be necessary.

Furthermore, GPS modernization can be problematic from an assisted GNSS (A-GNSS) point of view. Because of the GPS satellite modernization process described above, the number of supported signals may be different with respect to different satellites. Further still, support may suddenly change for a certain satellite (i.e., satellite identification) after it has been replaced by a newer version. From a terminal point of view, it would be advantageous to know a priori which signals the satellite is supporting in order to avoid wasting power on the acquisition of non-existing (non-supported) signals. In an opposite scenario, knowledge regarding which signals a satellite supports would afford the opportunity to search for a best possible signal for a certain satellite. As GPS modernization is taking place gradually, scenarios could arise where certain satellites, e.g., those with the latest L1C signals giving the best acquisition performance, are visible with satellites only supporting L1CA. Additionally, current A-GNSS (A-GPS) standards do not allow for indicating to a terminal, what generation a satellite belongs to or which signals are supported by a satellite. It should be noted that SBAS and QZSS satellites may also have different signal and frequency support amongst satellites in the same system.

The Radio Technical Commission for Maritime Services (RTCM) specification (RTCM v3.0, Feb. 10, 2004) uses GLONASS Orbit Slot Indices for Satellite Identification. Although GLONASS satellites are divided into three planes, the Orbit Slot index is continuous from orbit to orbit making it possible to identify the satellites. RTCM messages also carry the GLONASS Frequency Index. As described at, e.g., http://www.glonass-ianc.rsa.ru, GLONASS satellites are indexed as follows: satellites in Orbit I are indexed from 1 to 8; satellites in Orbit II are indexed from 9 to 16; and satellites in Orbit III are indexed from 17 to 24. However, RTCM does not provide an indexing/identification solution for different GPS generations.

The National Maritime Electronics Association (NMEA) 0183 version 3.01 (Jan. 1, 2002) specifications describe a definition for GLONASS satellite indices in NMEA messages. The NMEA 0183 utilizes Slot Numbers for satellite identification with a 64+ satellite slot number. Slot numbers 1 through 24 are utilized for a full GLONASS constellation of 24 satellites which in turn provides a range of 65 through 88 for use with GLONASS satellite identification numbers in the NMEA messages. Slot numbers 89 through 96 are available if the slot numbers above 24 are allocated to on-orbit spares. However, like RTCM, NMEA does not provide an indexing/identification solution for different GPS generations.

Current A-GPS/A-GNSS standards utilize a satellite identification based on PRN and do not support GLONASS satellites. The satellite identification in, e.g., GSM RRLP specifications, is a 6-bit parameter capable of including, e.g., the 6-bit PRN of Galileo satellites. Moreover, information elements (IEs) in Assistance Data specifications are organized hierarchically so that satellite system specific IEs are all referenced by a common GNSS identification (GNSS ID), as for example, in GPS, Galileo, GLONASS, etc.

SUMMARY OF THE INVENTION

In accordance with various embodiments, a first parameter is defined to provide generic satellite identification, including both PRN-based satellite identification and Orbit Slot number-based satellite identification. The first parameter is a generic assistance data satellite identifier that can be used to identify both GPS and GLONASS satellites. A second parameter is linked to the first parameter, where the second parameter is indicative of a frequency identification and is optional/conditional based upon whether or not current and/or near-future GLONASS satellites are in use. The use of generic satellite and frequency identification allows a GNSS receiver to determine the type of satellite from which a signal is received as well as which signals are supported for particular GPS satellites.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Embodiments of the invention are described by referring to the attached drawings, in which.

DETAILED DESCRIPTION OF THE PREFERRED EMBODIMENTS

Figure 1:
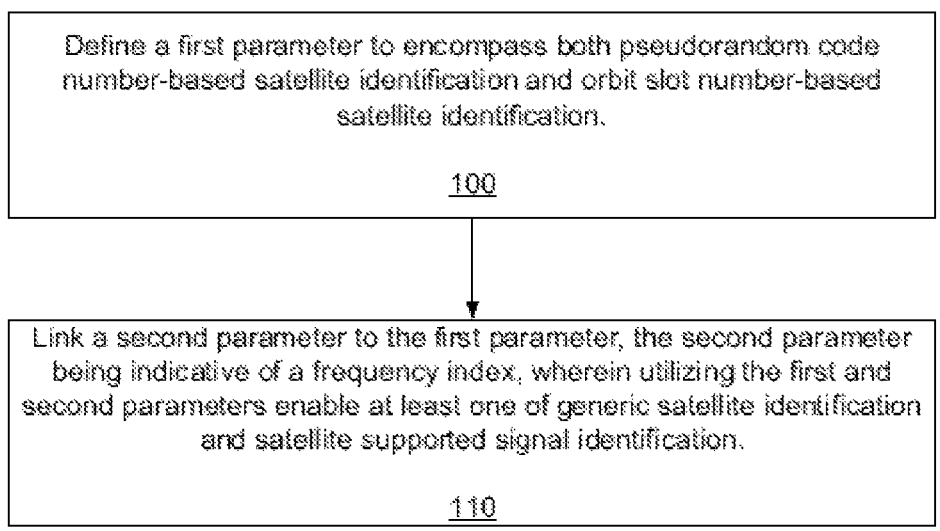
FIG. 1 is a flow chart showing a process by which various embodiments of the present invention may be implemented.

Various embodiments provide satellite and frequency identification for GNSS satellites in A-GNSS specifications. In accordance with various embodiments, the satellite and frequency identification can be utilized in a generic manner such that parameters which are conventionally reserved for satellite identification by PRN can be used also for GLONASS systems/satellites. Additionally, the satellite and frequency identification is defined such that it is "future-compatible." That is, the same satellite identification parameter can be utilized to identify modernized GLONASS-K satellites which are likely be identified by PRN codes, while optionally carrying a frequency identification parameter (e.g., frequency index) that is characteristic of existing and near-future GLONASS satellites. Further still and in accordance with various embodiments, the satellite and frequency identification can optionally be used to indicate supported signals (frequencies) for GPS satellites.

In accordance with various embodiments, existing satellite identification parameters conventionally utilized in the assistance data standards are redefined to also be used for GLONASS identification. In addition, an optional or conditional parameter is linked to the satellite identification parameter for a frequency identification, where frequency identification is indicative of an FDMA frequency value (k). Such a frequency identification parameter is optional because it is needed only for current GLONASS and/or near-future GLONASS, e.g., GLONASS-M satellites. Hence, utilization of the frequency identification parameter may be unnecessary and therefore, not included/not linked when considering next generation GLONASS satellites, e.g., GLONASS-K satellites. It should be noted that a frequency identification parameter can be included in an information element (IE) of a satellite signal along with a satellite identification parameter if a GNSS ID indicates that, e.g., a signal is being received from a GLONASS system/satellite.

Identification of a GLONASS satellite using a satellite identification parameter is performed similarly to RTCM and NMEA by using an Orbit Slot number for existing GLONASS satellites. However, for GLONASS-K satellites using, e.g., CDMA modulation, the satellite identification parameter utilized can be changed to PRN instead. Moreover, a GNSS receiver is able to differentiate between current and next generation GLONASS satellites by determining whether a frequency identification parameter exists in a satellite signal. The ability of a receiver to differentiate between the current and next generation GLONASS satellites is important due to a fundamental difference between modulation schemes utilized in FDMA and CDMA. Table 2 illustrates contemplated relationships between GNSS identification, satellite identification, and satellite types in accordance with various embodiments. It should be noted that the same/similar PRN and frequency identification mapping can optionally be applied to, e.g., SBAS and QZSS satellites.

TABLE 2

Mapping of Satellite ID and Frequency identification to GNSS satellites.

| GNSS ID | Satellite ID (6 bits) | Frequency Identification (5 bits) | Satellite Type |
|---|---|---|---|
| GPS | PRN | Not included (can mean L1CA support only) | GPS satellite, generation GPS IIR |
| GPS | PRN | Bit Mask to indicate supported signals as: Bit 0: L1CA Bit 1: L2C Bit 2: L5 Bit 3: L1C Bit 4: Reserved for future use | GPS satellite, generations GPS IIR-M, GPS IIF, GPS III |
| Galileo | PRN | Not included | Galileo satellite |
| GLONASS | Orbit Slot | Included, Frequency Index gives the value of the FDMA frequency (k) | GLONASS or GLONASS-M satellite |
| GLONASS | PRN | Not included | Next generation GLONASS satellite (GLONASS-K) |

FIG. 1 illustrates a flow chart indicative of processes performed in accordance with various embodiments. It should be noted that more or less processes are contemplated to achieve various embodiments. As illustrated in FIG. 1, a first parameter is defined to encompass both PRN-based satellite identification and Orbit Slot number-based satellite identification at 100. That is, the first parameter is a generic assistance data satellite identifier that can be used to identify both GPS and GLONASS satellites. At 110, a second parameter is linked to the first parameter, where the second parameter is indicative of a frequency identification. As described above this second parameter is optional/conditional based upon whether or not current and/or near-future GLONASS satellites are in use.

The use of generic satellite identification and frequency identification in accordance with various embodiments allows the same parameters to be used for any GNSS system in an A-GNSS context without having to implement system-specific parameters for each GNSS. Additionally, the frequency identification carries information about signals and/or frequencies supported by each GPS satellite so that a receiver can optimize its signal acquisition for enhanced performance while minimizing power consumption. Moreover, future compatibility for GLONASS modernization towards a CDMA-modulated system is provided. It should be noted that the Orbit Slot number and PRN-based identifications are mutually exclusive and can be encompassed by the generic satellite and frequency identification system and method in accordance with various embodiments. Further still, the 5-bit frequency index contemplated as an example herein is optimally suited for use with both the GLONASS frequency index and a GPS frequency mask (i.e., a GPS list of supported signals).

Figure 2:
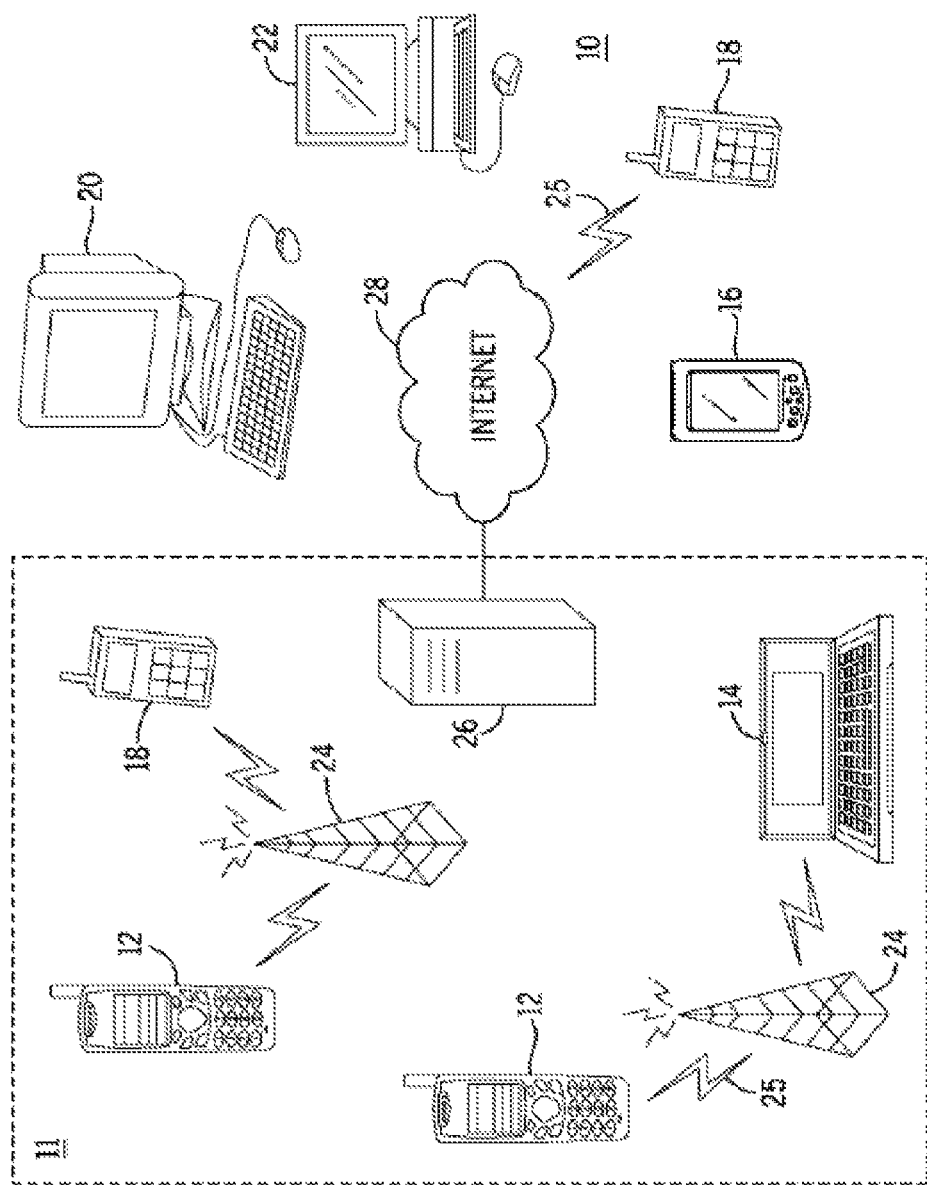
FIG. 2 is an overview diagram of a system within which various embodiments of the present invention may be implemented.

FIG. 2 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 2 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 3:
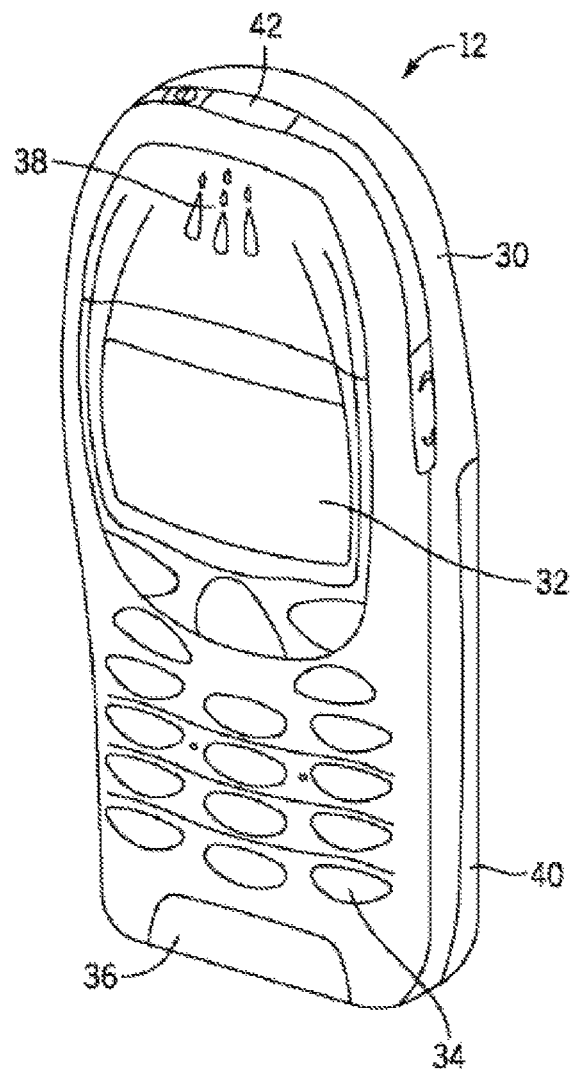
FIG. 3 is a perspective view of an electronic device that can be used in conjunction with the implementation of various embodiments of the present invention.
Figure 4:
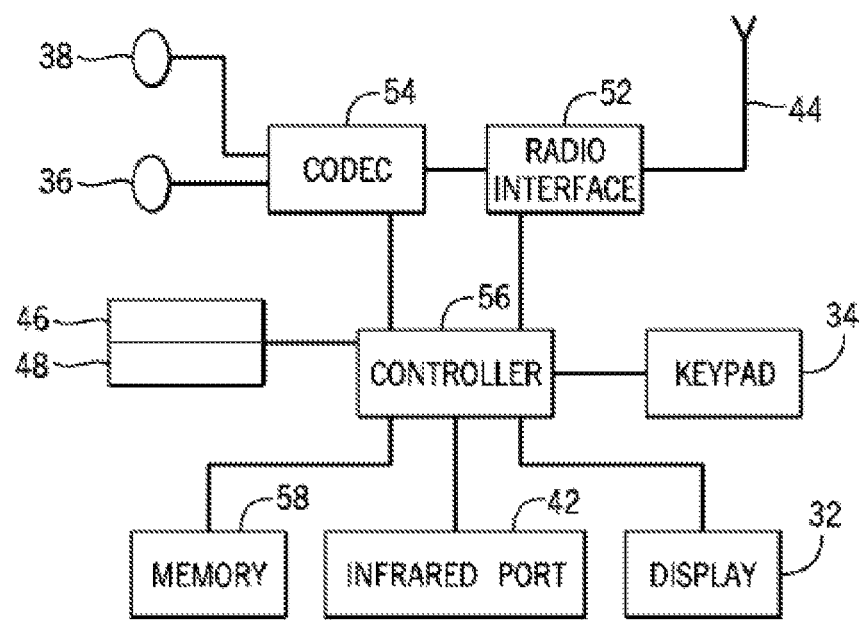
FIG. 4 is a schematic representation of the circuitry which may be included in the electronic device of FIG. 3.

FIGS. 3 and 4 show one representative electronic device 12 within which the present invention may be implemented. It should be understood, however, that the present invention is not intended to be limited to one particular type of device. The electronic device 12 of FIGS. 3 and 4 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
defining with a processor a first parameter for use with, including one at a time, both pseudorandom code number-based satellite identification and orbit slot number-based satellite identification;
linking with a processor a second parameter to the first parameter, the second parameter being indicative of a frequency identification, wherein utilization of the first parameter and the second parameter enable at least one of generic satellite identification and satellite supported signal identification, and wherein existence of the second parameter differentiates between GLONASS-M and GLONASS-K global navigation satellite system satellites; and
adding the first parameter and the second parameter to assistance data elements with a processor and providing assistance data for transmission to a receiver.

2. The method according to claim 1, wherein the first parameter is indicative of at least one of a global positioning system satellite, a GLONASS-M global navigation satellite system satellite, and a Galileo satellite if the first parameter comprises the pseudorandom code number-based satellite identification.

3. The method according to claim 1, wherein the first parameter is indicative of at least one of a GLONASS-M global navigation satellite system satellite and a near-future generation global navigation satellite system satellite if the first parameter comprises the orbit-slot number-based satellite identification.

4. The method according to claim 1, wherein the second parameter is optionally linked to the first parameter only when at least one of a GLONASS global navigation satellite system satellite and a GLONASS-M global navigation satellite system satellite is in use.

5. The method according to claim 1, wherein the frequency identification is indicative of a global navigation satellite system frequency index.

6. A computer program product comprising a computer-readable storage medium, said storage medium storing computer executable instructions configured to perform the processes of:
   defining a first parameter for use with, including one at a time, both pseudorandom code number-based satellite identification and orbit slot number-based satellite identification; and
   linking a second parameter to the first parameter, the second parameter being indicative of a frequency identification, wherein utilization of the first parameter and the second parameter enable at least one of generic satellite identification and satellite supported signal identification, and wherein existence of the second parameter differentiates between GLONASS-M and GLONASS-K global navigation satellite system satellites.

7. An apparatus, comprising:
   a processor; and
   a memory including computer program code;
the memory and the computer program code configured to, with the processor, cause the apparatus at least to:
   define a first parameter for use with, including one at a time, both pseudorandom code number-based satellite identification and orbit slot number-based satellite identification; and
   link a second parameter to the first parameter, the second parameter being indicative of a frequency identification, wherein utilization of the first parameter and the second parameter enable at least one of generic satellite identification and satellite supported signal identification, and wherein existence of the second parameter differentiates between GLONASS-M and GLONASS-K global navigation satellite system satellites.

8. The apparatus according to claim 7, wherein the first parameter is indicative of at least one of a global positioning system satellite, a GLONASS-K global navigation satellite system satellite, and a Galileo satellite if the first parameter comprises the pseudorandom code number-based satellite identification.

9. The apparatus according to claim 7, wherein the first parameter is indicative of at least one of a GLONASS global navigation satellite system satellite and a GLONASS-M global navigation satellite system satellite if the first parameter comprises the orbit-slot number-based satellite identification.

10. The apparatus according to claim 7, configured to optionally link the second parameter to the first parameter only when at least one of a GLONASS global navigation satellite system satellite and a GLONASS-M global navigation satellite system satellite is in use.

11. The apparatus according to claim 7, wherein the frequency identification is indicative of a global navigation satellite system frequency index.

12. The apparatus according to claim 7, wherein the defining and linking processes are implemented by computer code embodied on a computer-readable medium.

13. The apparatus according to claim 7, wherein the defining and linking processes are implemented by a chipset.

14. An apparatus, comprising:
   a processor; and
   a memory including computer program code;
the memory and the computer program code configured to, with the processor, cause the apparatus at least to receive assistance data; and
   examine the assistance data to determine whether a frequency identification is present in the assistance data, the presence of the frequency identification in conjunction with the orbit slot number-based satellite identification being indicative that a satellite signal is received from one of a current global navigation satellite system satellite and a near-future global navigation satellite system satellite.

15. The apparatus according to claim 14, further caused to determine whether a satellite identification received in the assistance data comprises one of a pseudorandom code number-based satellite identification and an orbit slot number-based satellite identification.

16. The apparatus according to claim 14, wherein the frequency identification is indicative of a global navigation satellite system frequency index.

17. The apparatus according to claim 14, wherein the receiving and examining processes are implemented by computer code embodied on a computer-readable medium.

* * * * *